United States Patent
Choi et al.

(10) Patent No.: US 10,567,296 B2
(45) Date of Patent: Feb. 18, 2020

(54) SERVER FOR PERFORMING LOW POWER COMMUNICATION AND OPERATION METHOD THEREOF, AND SCHEDULING MAP GENERATION METHOD FOR PERFORMING LOW POWER COMMUNICATION

(71) Applicant: Samsung Electronics Co., Ltd., Suwon-si, Gyeonggi-Do (KR)

(72) Inventors: Byung-Kwon Choi, Suwon-si (KR); Chang Hyun Roh, Seoul (KR); Youngbo Shim, Seoul (KR); Joon-Kee Cho, Yongin-si (KR); Taesin Ha, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 14/541,918

(22) Filed: Nov. 14, 2014

(65) Prior Publication Data
US 2016/0021223 A1    Jan. 21, 2016

(30) Foreign Application Priority Data
Jul. 21, 2014    (KR) .................. 10-2014-0091856

(51) Int. Cl.
*H04L 12/805*    (2013.01)

(52) U.S. Cl.
CPC ................. *H04L 47/365* (2013.01)

(58) Field of Classification Search
CPC ... H04L 41/0896; H04L 69/22; H04L 47/365; H04L 49/252; H04L 49/254; H04L 69/166
See application file for complete search history.

(56) References Cited

U.S. PATENT DOCUMENTS

| | | | |
|---|---|---|---|
| 2008/0062868 A1* | 3/2008 | GadelRab | H04L 47/10 370/230 |
| 2010/0322124 A1 | 12/2010 | Luoma et al. | |
| 2012/0079486 A1* | 3/2012 | Brandt | G06F 9/4887 718/102 |

(Continued)

FOREIGN PATENT DOCUMENTS

| | | |
|---|---|---|
| EP | 1724983 A1 | 11/2006 |
| KR | 100288158 B1 | 8/2000 |

(Continued)

OTHER PUBLICATIONS

Reviriego et al. Increasing the MTU size for Energy Efficiency in Ethernet. ISSWC 2010, UCC, Jun. 23-24.*

(Continued)

*Primary Examiner* — Jeffrey M Rutkowski
*Assistant Examiner* — Basil Ma
(74) *Attorney, Agent, or Firm* — Harness, Dickey & Pierce, P.L.C.

(57) ABSTRACT

Provided is a server for performing a low power communication and an operation method of the server that may generate a packet including collected data based on a maximum number of data items transmitted based on a maximum transmission unit (MTU) established between a client and the server and an allowable delay time of at least one service, and may transmit the generated packet to the client.

10 Claims, 9 Drawing Sheets

(56) References Cited

U.S. PATENT DOCUMENTS

2014/0321275 A1* 10/2014 Anand ................ H04L 47/125
                                                              370/232
2015/0319041 A1* 11/2015 Diab .................... G06F 1/3206
                                                              709/221
2015/0319693 A1* 11/2015 Kneckt ............. H04W 52/0209
                                                              370/311

FOREIGN PATENT DOCUMENTS

| KR | 1020060020262 A | 3/2006 |
|----|-----------------|--------|
| KR | 1020070090482 A | 9/2007 |
| KR | 1020080079630 A | 9/2008 |
| KR | 1020140042294   | 4/2014 |

OTHER PUBLICATIONS

C. L. Liu and J. Layland. Scheduling Algorithms for Multiprogramming in Hard-Real-Time Environment. Journal of ACM vol. 20, No. 1, Jan. 1973, pp. 46-61.*

Stevens, Richard. TCP/IP Illustrated vol. 1: The Protocols Second Edition 2011. 3.2.2 Ethernet Frame Format.*

Lecture notes from CS457 "Computer Networking and the Internet" Lecture 10 Internetworking and IP Dan Massey slide 5 IP Fragmentation and Reassembly. (Year: 2011).*

* cited by examiner

SERVER FOR PERFORMING LOW POWER COMMUNICATION AND OPERATION METHOD THEREOF, AND SCHEDULING MAP GENERATION METHOD FOR PERFORMING LOW POWER COMMUNICATION

CROSS-REFERENCE TO RELATED APPLICATION

This application claims the priority benefit of Korean Patent Application No. 10-2014-0091856, filed on Jul. 21, 2014, in the Korean Intellectual Property Office, the disclosure of which is incorporated herein by reference.

BACKGROUND

1. Field

Example embodiments relate to a server for performing low power communication and a method of operating the server and, more particularly, to a server for performing low power communication by adjusting a number of times for transmitting data and a method of operating the server.

2. Description of the Related Art

In a periodical data communication method, terminals may transmit data based on a predetermined period. A number of transmission times may significantly affect power consumption in periodical data communication. In contrast, in terms of a quantity of data, data less than or equal to a maximum transmission unit (MTU) of a packet may have a trivial effect on the power consumption.

In the periodical data communication, an allowable delay time for transmission may vary based on a type of service. When data is constantly transmitted at a minimum transmission period among transmission periods of a service, the power consumption may increase while other data communication conditions are satisfied.

In an apparatus susceptible to power consumption such as a terminal operating based on a battery, an increase in power consumption due to an increase in the number of transmission times may result in a decrease in a use of time for a main function of the apparatus.

SUMMARY

The foregoing and/or other aspects of the inventive concepts are achieved by providing method and systems of operating a server for communicating with a client.

At least one example embodiments relates to a method of operating a server communicating with a client.

According to at least one example embodiment, a method of operating a server communicating with a client includes generating, by the server, a packet including collected data using a maximum number of data items to be transmitted and an allowable delay time defined for at least one service, the maximum number of data items to be transmitted being based on a maximum transmission unit (MTU) that is established between the client and the server; and transmitting, by the server, the generated packet to the client.

At least one example embodiments provides that the generating includes determining the maximum number of data items to be transmitted by dividing the MTU by a quantity of data corresponding to the at least one service.

At least one example embodiment provides that the server is configured to provide a plurality of services, the at least one service being one of the plurality of services, and the allowable delay time of the at least one service is set differently than the other ones of the plurality of services.

At least one example embodiment provides that the server is configured to provide a plurality of services, the at least one service being one of the plurality of services, and the generating includes determining an allowable delay time of a first service from among the plurality of services that corresponds to the collected data of the at least one service; storing the collected data when the determined allowable delay time of the first service is greater than a threshold; and generating the packet including the stored data when a number of items of the stored data is greater than or equal to the maximum number of data items to be transmitted.

At least one example embodiment provides that the server is configured to provide a plurality of services, and the method further includes determining a service from among the plurality of services that corresponds to the collected data based on (i) a transmission period of the at least one service, and (ii) an allowable delay time of the at least one service in response to an overlap of a point in time at which data is stored.

At least one example embodiment provides that the generating further includes generating the packet including pre-stored data and the collected data when the allowable delay time of the first service is less than or equal to the threshold.

At least one example embodiment provides that the generating the packet including the pre-stored data and the collected data includes generating the packet including the collected data when the pre-stored data is absent.

At least one example embodiment provides that.

At least one example embodiment provides that the storing includes setting, for the collected data, a transmission threshold time based on the allowable delay time of the first service.

At least one example embodiment provides that the storing includes storing the collected data according to a priority order associated with the transmission threshold time.

At least one example embodiment provides that the generating further includes determining the transmission threshold time for each item of the stored data when the number of items of the stored data is less than the maximum number of data items to be transmitted; and generating the packet including the stored data when the transmission threshold time set for at least one of the items of the stored data expires.

At least one example embodiment relates to a method of generating a scheduling map for data transmission.

According to at least one example embodiment a method of generating a scheduling map for data transmission includes scheduling, by a server, collected data to form a packet by using a maximum number of data items to be transmitted and an allowable delay time of at least one service, the maximum number of data items to be transmitted being based on a maximum transmission unit (MTU) established between the client and the server; and generating, by the server, a scheduling map for scheduling the packet to be transmitted to a client.

At least one example embodiment provides that the server is configured to provide a plurality of services, the at least one service being one of the plurality of services, and the scheduling includes determining an allowable delay time of a first service from among the plurality of services that corresponds to the collected data of the at least one service; storing the collected data in response to detecting a presence of the allowable delay time associated with the first service;

and scheduling the stored data to form the packet when a number of items of stored reference data is greater than or equal to the maximum number of data items to be transmitted.

At least one example embodiment provides that the scheduling further includes scheduling the stored reference data and the collected data to form the packet in response to detecting an absence of the allowable delay time associated with the first service.

At least one example embodiment provides that the storing further includes setting, for the collected data, a transmission threshold time based on the determined allowable delay time of the first service.

At least one example embodiment provides that the stored data includes a plurality of items, and the scheduling further includes determining a transmission threshold time for each of the items of the stored data when a number of the items of the stored data is less than the maximum number of data items to be transmitted; and scheduling the stored data to form the packet in response to determining the transmission threshold time for at least one of the items of the stored data.

At least one example embodiment relates to a server configured to communicate with a client.

According to at least one example embodiment, a server configured to communicate with a client includes a packet generator configured to generate a packet including collected data, the packet generator configured to generate the packet using a maximum number of data items to be transmitted and an allowable delay time of at least one service, the maximum number of data items to be transmitted being based on a maximum transmission unit (MTU) established between the client and the server. The server includes a transmitter configured to transmit the generated packet to the client; and a memory device configured to store the collected data.

At least one example embodiment provides that the server is configured to provide a plurality of services, the at least one service being one of the plurality of services, and the packet generator is configured to determine an allowable delay time of a first service from among the plurality of services that corresponds to the collected data of the at least one service; store the collected data in the memory device when the determined allowable delay time of the first service is greater than a threshold; and generate the packet including the stored data when a number of items of the stored data is greater than or equal to the maximum number of data items to be transmitted.

At least one example embodiment provides that the packet generator is configured to generate the packet including the collected data and stored data when the allowable delay time is less than or equal to the threshold.

At least one example embodiment provides that the server is configured to provide a plurality of services, the at least one service being one of the plurality of services, and the memory device is configured to set a transmission threshold time based on an allowable threshold time of a service from among the plurality of services that corresponds to the collected data.

At least one example embodiment provides that the packet generator is configured to determine the transmission threshold time set for each item of the stored data when the number of items of stored data is less than the maximum number of data items to be transmitted, and generate the packet including the stored data stored in response to an expiration of the transmission threshold time set for at least one of the items of the stored data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
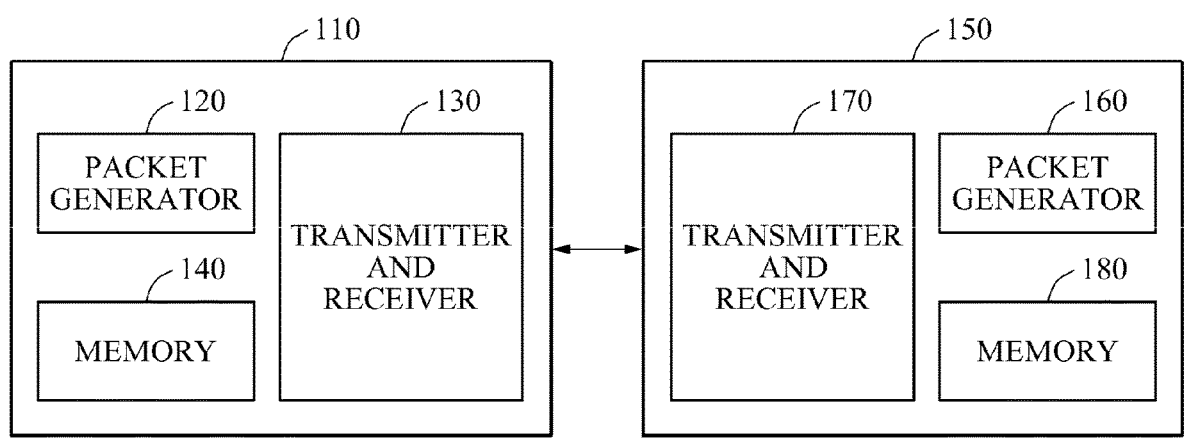
FIG. 1 illustrates a server and a client according to example embodiments.

Hereinafter, exemplary embodiments will be described in detail with reference to the accompanying drawings. However, it should be understood that these embodiments are not construed as limited thereto. Like reference numerals in the drawings denote like elements.

The elements or features may be considered selective unless otherwise mentioned. Specific structural and functional details disclosed herein are merely representative for purposes of describing example embodiments. Example embodiments may, however, be embodied in many alternate forms and should not be construed as limited to only the embodiments set forth herein. Each element of feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaces with corresponding constructions of another embodiment.

Accordingly, while example embodiments are capable of various modifications and alternative forms, embodiments thereof are described in detail. It should be understood, however, that there is no intent to limit example embodiments to the particular forms disclosed, but to the contrary, example embodiments are to cover all modifications, equivalents, and alternatives falling within the scope of example embodiments Like numbers refer to like elements throughout the description.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order as described. For example, two operations described in succession may in fact be executed substantially concurrently or may sometimes be executed in the reverse order, depending upon the functionality/acts involved.

The terms used in this specification were selected to include current, widely-used, general terms, in consideration of the functions of the present invention. However, the terms may represent different meanings according to the intentions of the skilled person in the art or according to customary usage, the appearance of new technology, etc. As such, the terms used in the specification are not to be defined simply by the name of the terms but are to be defined based on the meanings of the terms as well as the overall description of the present invention.

FIG. 1 illustrates a server 110 and a client 150 according to example embodiments.

Referring to FIG. 1, the server 110 performs data communication with the client 150. The server 110 includes a packet generator 120, a transmitter and receiver 130, and a memory 140. The client 150 includes a packet generator 160, a transmitter and receiver 170, and a memory 180.

Client 150 is a physical hardware device that is capable of running one or more applications. Client 150 may include a transmitter/receiver (or alternatively, a transceiver), memory, one or more processors, and/or other like components. Client 150 may be configured to send/receive data to/from base station 110. Client 150 may include one or more processors that are designed to sequentially and automatically carry out a sequence of arithmetic or logical operations; equipped to record/store digital data on a machine readable medium; and transmit and receive digital data. The one or more processors may be configured to carry out instructions of a computer program by performing the basic arithmetical, logical, and input/output operations of the system. The one or more processors may include a single-core processor, a dual-core processor, a triple-core processor, a quad-core processor, etc. The one or more processors may perform a variety of functions for the client 150 and may process data by executing program code, one or more software modules, firmware, middleware, microcode, hardware description languages, and/or any other like set of instructions stored in the memory 180. The program code may be provided to the one or more processors by memory 180, one or more drive mechanisms (not shown), and/or via a network interface. In order to perform the variety of functions and data processing operations, the program code and/or software components are loaded into the one or more processors. Once the program code is loaded into the one or more processors, the one or more processors may be programmed to perform the various operations and functions delineated by the program code, thereby transforming the one or more processors into a special purpose processor. Client 150 may include wireless phones or smartphones, laptop personal computers (PCs), tablet PCs, wearable computing devices, and/or any other physical or logical device capable of recording, storing, and/or transferring digital data via server 110 and/or any other like network element.

Memory 180 is a hardware device configured to store an operating system and program code for one or more software components. Memory 180 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 180 using a drive mechanism (not shown). Such separate computer readable storage medium may include a memory card, memory stick, removable flash drive, sim card, and/or other like computer readable storage medium (not shown). In some embodiments, software components may be loaded into memory 180 via a network interface rather than via a computer readable storage medium.

Client 150 also includes a transmitter and receiver 170. The transmitter and receiver 170 may be any type of hardware device that generates or otherwise produces radio waves in order to communicate with one or more other devices (e.g., server 110). The transmitter and receiver 170 may be coupled with an antenna (not shown) in order to transmit data to one or more other devices. The transmitter and receiver 170 may be configured to receive digital data from one or more components of client 150, and convert the received digital data into an analog signal for transmission over an air interface. The transmitter and receiver 170 may be any type of hardware device that can receive and convert a signal from a modulated radio wave into usable information, such as digital data. The transmitter and receiver 170 may be coupled with the antenna (not shown) in order to capture radio waves. The transmitter and receiver 170 may be configured to send digital data converted from a captured radio wave to one or more other components of client 150. Client 150 may include a transceiver (not shown) instead of transmitter and receiver 170, where the transceiver is a single component configured to provide the functionality of a transmitter and a receiver 170 as discussed above.

Client 150 also includes packet generator 160, which may have a same or similar configuration and functionality as the packet generator 120 discussed below. Furthermore, in some embodiments, client 150 may include many more components than those shown in FIG. 1, such as a display device, one or more image sensors, network interface, and/or other like physical hardware components. However, it is not necessary that all of these generally conventional components be shown in order to disclose the example embodiments.

Server 110 is a physical hardware device configured to provide services for client devices (e.g., the client 150, etc.) connected to a communications network. The server 110 may be any network element capable of receiving and responding to requests from one or more client devices (e.g., client 150) across a computer network to provide one or more services. Accordingly, server 110 may be configured to communicate with the client 150 via a wireless protocol. Additionally, server 110 may be a single physical hardware device, or server 110 may be physically or logically connected with other network devices, such that the server 110 may reside on one or more physical hardware devices. The server 110 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The server 110 may be configured to establish, manage, and terminate one or more communications sessions between one or more computing devices, such as between server 110 and client 150 and/or between client 150 and another client device (not shown).

The server 110 may include one or more processors (not shown) and one or more data storage devices (e.g., memory 140, and the like). The one or more processors may be special purpose computer processing devices configured to carry out program code stored in the one or more storage devices by performing arithmetical, logical, and input/output operations. For example, program code and/or software modules may be loaded into the one or more processors. Once the program code and/or software modules are loaded into the one or more processors, the one or more processors may be configured to perform user operations according to various example embodiments.

The one or more storage devices may be a computer readable storage medium that generally includes a random access memory (RAM), read only memory (ROM), a permanent mass storage device (such as a disk drive), and/or any other like data storage mechanism capable of storing and recording data. The one or more storage devices may be configured to store program code for one or more operating systems and/or program code for one or more software components and/or modules for performing operations according to various example embodiments. These software components may also be loaded from a separate computer readable storage medium into the one or more storage devices and/or the one or more processors using a drive mechanism (not shown). Such separate computer readable storage medium may include a floppy drive, disc, tape, Blu-ray/DVD/CD-ROM drive, memory card, removable flash memory drive, sim card, and/or other like computer readable storage medium (not shown). In some embodiments, software components may be loaded into the one or more storage devices and/or the one or more processors from a remote data storage device via a network interface, rather than via a computer readable storage medium.

Server 110 also includes a transmitter and receiver 130. The transmitter and receiver 130 may be any type of hardware device that generates or otherwise produces radio waves in order to communicate with one or more other devices (e.g., client 150). The transmitter and receiver 130 may be coupled with an antenna (not shown) in order to transmit data to one or more other devices. The transmitter and receiver 130 may be configured to receive digital data from one or more components of server 110, and convert the received digital data into an analog signal for transmission over an air interface. The transmitter and receiver 130 may be any type of hardware device that can receive and convert a signal from a modulated radio wave into usable information, such as digital data. The transmitter and receiver 130 may be coupled with the antenna (not shown) in order to capture radio waves. The transmitter and receiver 130 may be configured to send digital data converted from a captured radio wave to one or more other components of server 110. Server 110 may include a transceiver (not shown) instead of transmitter and receiver 130, where the transceiver is a single component configured to provide the functionality of a transmitter and a receiver 130 as discussed above.

Furthermore, in some embodiments, server 110 may include many more components than those shown in FIG. 1, such as a display device, one or more image sensors, network interface, and/or other like physical hardware components. However, it is not necessary that all of these generally conventional components be shown in order to disclose the example embodiments.

In embodiments where the client 150 is a biometric system such as a wearable device for sensing user biometric information, the client 150 may send biometric data collected by a biometric sensor to the server 110. The server 110 may receive the data collected by the sensor for sensing biometric information of the user, process the data, and transmit the processed data to the client 150.

In embodiments where the client 150 is one of a smartphone, a tablet personal computer (PC), a wearable device, and a desktop PC, the client 150 may receive data from the server 110, and transmit the data to a corresponding module based on a service, which corresponds to the received data. Also, the data received by client 150 may be transmitted to the server 110.

The server 110 may periodically transmit the data collected by the sensor for sensing biometric information, to the client 150. When the server 110 operates based on a limited capacity of power source such as a battery, power consumption due to a periodical data transmission may result in a decrease in a use of time for a main function of the server 110. Thus, the server 110 may reduce a number of data communication signals and/or data bursts in order to reduce the power consumption of the data communication.

The packet generator 120 may generate a packet including collected data by using a maximum number of data items to be transmitted based on a maximum transmission unit (MTU) established between the client 150 and the server 110 and an allowable delay time of at least one service. An MTU may be a maximum allowable size of a data packet that is defined by a communications protocol. It should be noted that in some embodiments, the MTU may have a fixed size, while in other embodiments the MTU may have a variable and/or dynamic MTU size that is determined when a communications session is established between the server 110 and the client 150. In embodiments where the MTU size is variable and/or dynamic, the MTU size may be based on the service provided by the server 110 to the client 150.

The at least one service may be defined between the server 110 and the client 150. For example, the at least one service may be defined between the server 110 and the client 150 as a log service for storing collected data, an analysis service for analyzing biometric information on a user based on the collected data, and/or a monitoring service for providing the collected data to the user in real time.

The aforementioned services may be provided as examples for describing the present disclosure, and the at least one service may be set diversely in consideration of usages and characteristics of the server 110 and the client 150. Therefore, it should be noted that the server 110 may provide many more services than those described above; however, it is not necessary that all of these generally conventional services be described in order to disclose the example embodiments.

The allowable delay time may be set for the at least one service in advance, and set differently for each service. When the server 110 transmits data, the server 110 may transmit the data to the client 150 within an allowable delay time set for a service corresponding to the data.

For example, when an allowable delay time of a first service is zero microseconds (μs), data corresponding to the first service may need to be transmitted immediately with little or no delay. When an allowable delay time of a second service is 100 μs, data corresponding to the second service may be transmitted at a desired (or alternatively "predetermined") point in time of 100 μs. The data corresponding to the second service may need to be transmitted to the client 150 before expiration of the allowable delay time of 100 μs starting from a point in time at which the data is collected.

The allowable delay time may be set differently based on characteristics of a service to be provided to client 150. For example, the log service for storing the collected data may be a service for recording and/or storing data, and thus, a relatively great amount of allowable delay time may be allowed for the log service in comparison to other services provided by the server 110. The allowable delay time may be set for the analysis service for analyzing the biometric information on the user based on the collected data and in consideration of an analysis process delay in conjunction with another device. Therefore, the allowable delay for the analysis service may be a relatively moderate amount in comparison to the other services provided by the server 110. The monitoring service may be used to provide data to the user in real time, and thus, a relatively small amount of allowable delay time may be set for the monitoring service when compared to the other services provided by the server 110. In some embodiments, the allowable delay time may not be set for the monitoring service due to a higher data rate that may be preferred for the monitoring service. Therefore, in various embodiments, the allowable delay time that is set for each service may be based on an expected Quality of Experience (QoE) and/or Quality of Service (QoS) for the services being provided to the client 150.

As noted above, the MTU may be a maximum data quantity value that may be transmitted without using a segment, and may be established between the server 110 and the client 150. When a quantity of data is greater than or equal to the MTU, the data may be divided into a desired number of packets to be transmitted. Concisely, the MTU may be a data quantity allowed to be transmitted using a packet.

For example, the MTU may be 1008 bytes in a Bluetooth device, 1500 bytes in an Ethernet network, and 1492 bytes in a point to point protocol over Ethernet (PPPoE) connection based on a modem. As such, the MTU may be established between the server 110 and the client 150 based on a network interface therebetween.

The maximum number of items of the transmitted data (or the maximum number of items of data to be transmitted) may correspond to a value obtained by dividing the MTU by a quantity of data corresponding to at least one service. For example, when the quantity of data is 200 bytes, and when the server 110 communicates with the client 150 through the Bluetooth device, the MTU may be 1008 bytes. In this example, the maximum number of items of the transmitted data (or the maximum number of items of data to be transmitted) may be "5" corresponding to an integer value obtained by dividing the MTU by the quantity of data. Thus, the server 110 may generate a packet including up to five items of data and transmit the generated packet to the client 150.

The packet generator 120 may verify the first service corresponding to the collected data. As described above, each of the at least one service may have a different allowable delay time based on characteristics of the service.

For example, a transmission period of the log service, which is used to store the collected data, may be set equally to a period of time for collecting the data so as to store all items of the collected data. The analysis service may require at least a desired (or alternatively, "predetermined") number of items of data to analyze the biometric information based on the collected data, and thus, a transmission period of the analysis service may be set to be longer than the transmission period of the log service. Since the monitoring service is not for providing all items of the collected data to the user, a longest and/or maximum transmission period may be set for the monitoring service. The foregoing descriptions may be provided as examples of the present disclosure. Thus, it would be apparent to those skilled in the art that various definitions may be applied based on a setting between the server 110 and the client 150.

The server 110 may determine a service corresponding to the data collected based on the transmission period of the at least one service. The server 110 may verify a service having a transmission period matching a transmission time of periodically collected data based on a desired (or alternatively, "predetermined") point in time as a reference.

When a service having a transmission period matching the transmission time is verified, the server 110 may determine that the collected data corresponds to the service.

When at least two services having transmission periods matching the transmission time are verified, the server 110 may verify an allowable delay time for each of the at least two services. The server 110 may give a higher priority to a service having a shorter allowable delay time among the at least two services. Through this, the server 110 may determine that the collected data corresponds to a service having a shortest allowable delay time among the at least two services.

The server 110 may transmit information on the service corresponding to the collected data to the packet generator 120. The packet generator 120 may verify the first service corresponding to the collected data based on the transmitted information.

The packet generator 120 may compare the allowable delay time of the first service to a threshold and determine whether the collected data is to be transmitted or stored in the memory 140. In various embodiments, the threshold may be a preset value that is defined between the server 110 and the client 150. In various embodiments, the threshold or a desired range of thresholds may be based on one or more design choices and/or determined based on empirical studies.

When the allowable delay time of the first service is greater than the threshold, the packet generator 120 may store the collected data in the memory 140. When a number of items of data stored in the memory 140 is greater than the maximum number of items of the transmitted data (or the maximum number of items of data to be transmitted), a packet including the stored data may be generated.

When the number of items of data stored in the memory 140 is less than or equal to the maximum number of items of the transmitted data (or the maximum number of items of data to be transmitted), the packet generator 120 may verify or otherwise determine allowable delay times of the stored data. When at least one of the allowable delay times expires, the packet generator 120 may generate a packet including the stored data even though the number of items of the stored data is less than the maximum number of items of the transmitted data (or the maximum number of items of data to be transmitted). In various embodiments, the packet generator 120 may use a software timer and/or a hardware timer to verify or otherwise determine that the at least one of the allowable delay times has expired.

When the number of items of data stored in the memory 140 is less than or equal to the maximum number of items of the transmitted data (or the maximum number of items of data to be transmitted), the packet generator 120 may generate a packet including the collected data and previously stored (or alternatively "pre-stored") data. When the allowable delay time of the first service is less than or equal to the threshold, the collected data may need to be transmitted immediately without delay. Therefore, the packet may be generated by incorporating the collected data and the previously stored (or alternatively "pre-stored") data. When the memory 140 does not include the previously stored (or alternatively "pre-stored") data, the packet generator 120 may generate the packet by incorporating the collected data.

Figure 3:
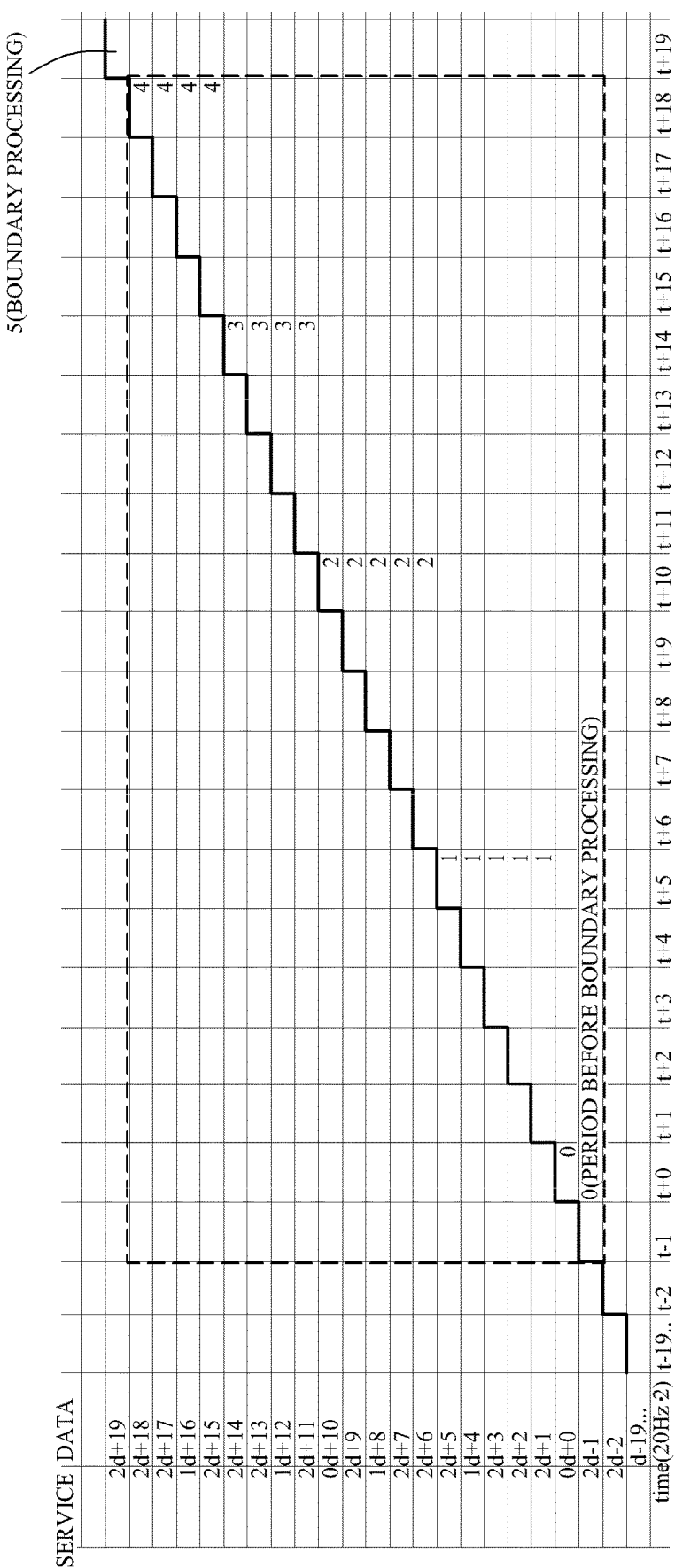
FIG. 3 illustrates a scheduling map according to example embodiments.
Figure 4:
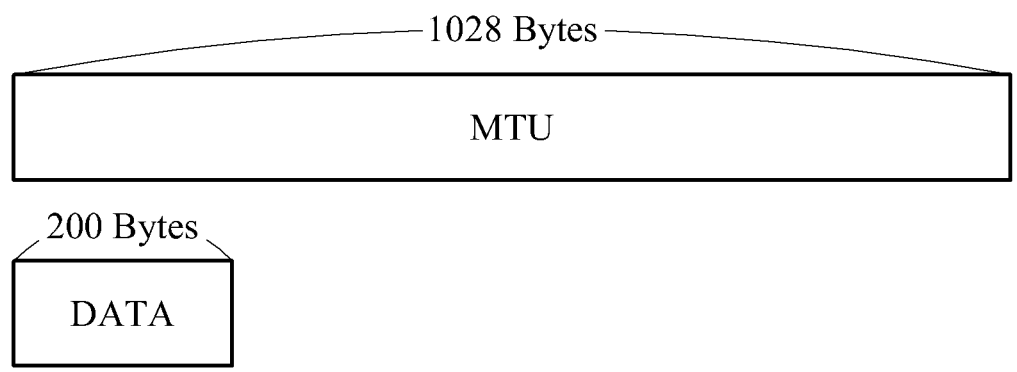
FIG. 4 illustrates a quantity of data and a maximum transmission unit (MTU) according to example embodiments.
Figure 5:
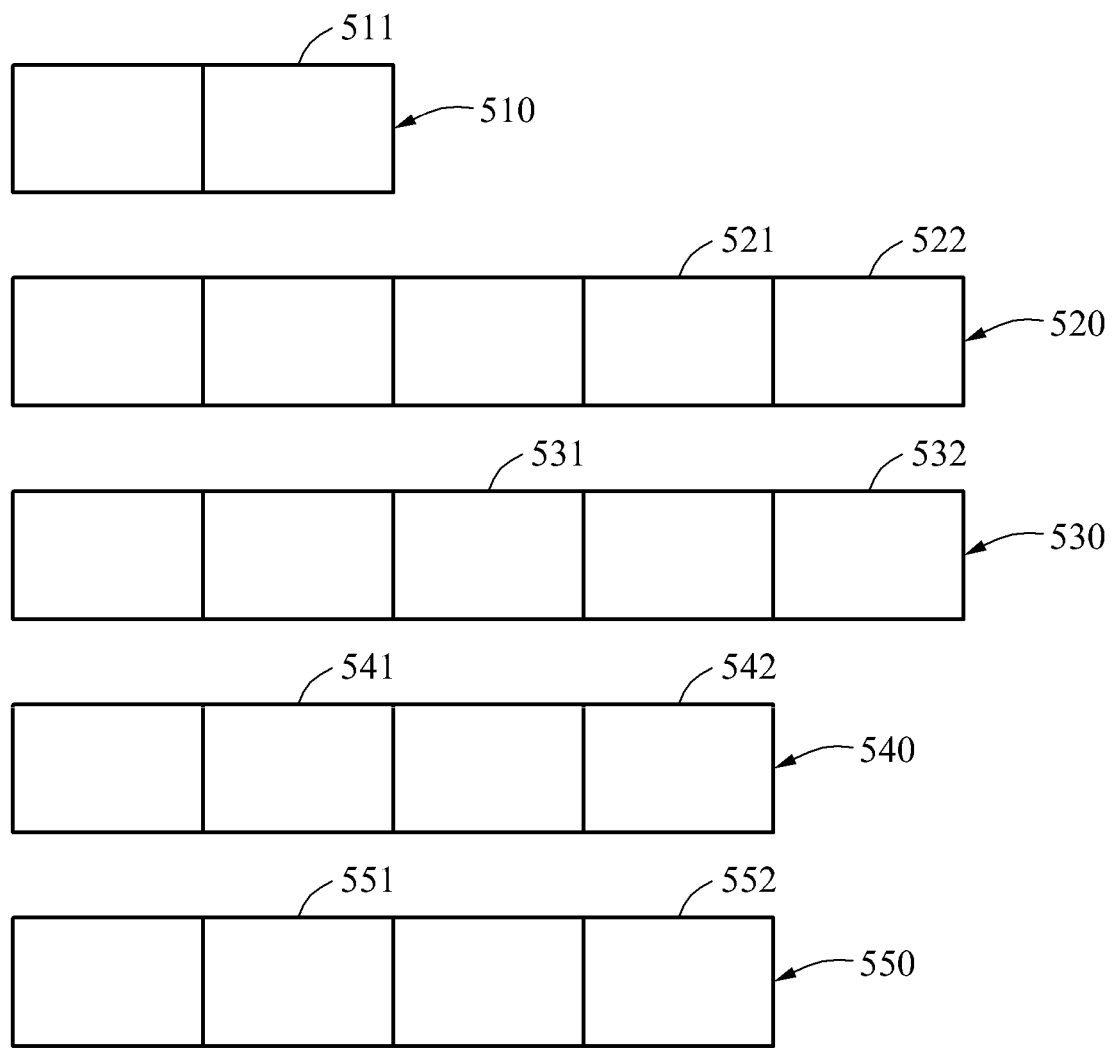
FIG. 5 illustrates a packet generated to be transmitted to a client according to example embodiments.

Descriptions about a method of generating the packet to be transmitted to the client 150 in the packet generator 120 based on the collected data will be provided with reference to FIGS. 3 through 5.

The transmitter and the receiver 130 may transmit the packet generated in the packet generator 120 to the client 150. The transmitter and receiver 130 may receive the packet from the client 150.

The memory 140 may store the collected data. In a process of the storing, the memory 140 may store the collected data by setting a transmission threshold time based on the allowable delay time of the service corresponding to the collected data.

The memory 140 may store the collected data in a priority order of the transmission threshold time. Though this, the packet generator 120 may verify or otherwise determine the transmission threshold time for each item of the collected data.

When the transmission threshold time of each item of the collected data is equal, the memory 140 may store the collected data based on an order in which the data is collected. Through this, the packet generator 120 may generate the packet in the order that the data is collected, and transmit the generated packet to the client 150 according to the order in which the data is collected.

As described above, in a process of communicating with the client 150, the server 110 may generate the packet by storing the collected data and transmit the generated packet in lieu of transmitting the collected data periodically. Through this, the server 110 may reduce the number of times the collected data is transmitted to the client 150, thereby reducing power consumption used for data communication.

Despite the above description being explained from a position of the server 110, the client 150 may also identically generate a packet by incorporating data and transmit the generated packet to the server 110. Thus, the packet generator 160 of the client 150 may operate identically to the packet generator 120 of the server 110. The packet generator 160 of the client 150 may also store the data in the memory 180 and generate a packet including the stored data. Subsequently, the packet generator 160 may transmit the generated packet to the server 110 using the transmitter and receiver 170, or transmit the generated packet to a corresponding module for each service.

In FIG. 1, the packet generator 120 of the server 110 may generate a packet by incorporating data and transmit the generated packet to the client 150 without generating a separate scheduling map. In some example embodiments, the server 110 may generate a packet including collected data by generating a scheduling map using a scheduler in lieu of installing the packet generator 120 separately.

The server 110 may generate the packet including the collected data based on the generated scheduling map and transmit the generated packet to the client 150. Hereinafter, descriptions about the scheduler for generating the scheduling map will be provided with reference to FIG. 2.

It should be noted that as shown in FIG. 1, only one client 150 and one server 110, are present. According to various embodiments, multiple client devices, multiple servers, and/or any number of databases (not shown) may be present. Additionally, in some embodiments, server 110 and/or any associated databases may be virtual machines, and/or they may be provided as part of a cloud computing service. Additionally, in various example embodiments, the server 110 may reside on one physical hardware device, and/or may be otherwise fully integrated with another device such as a wearable computing device and the like.

Figure 2:
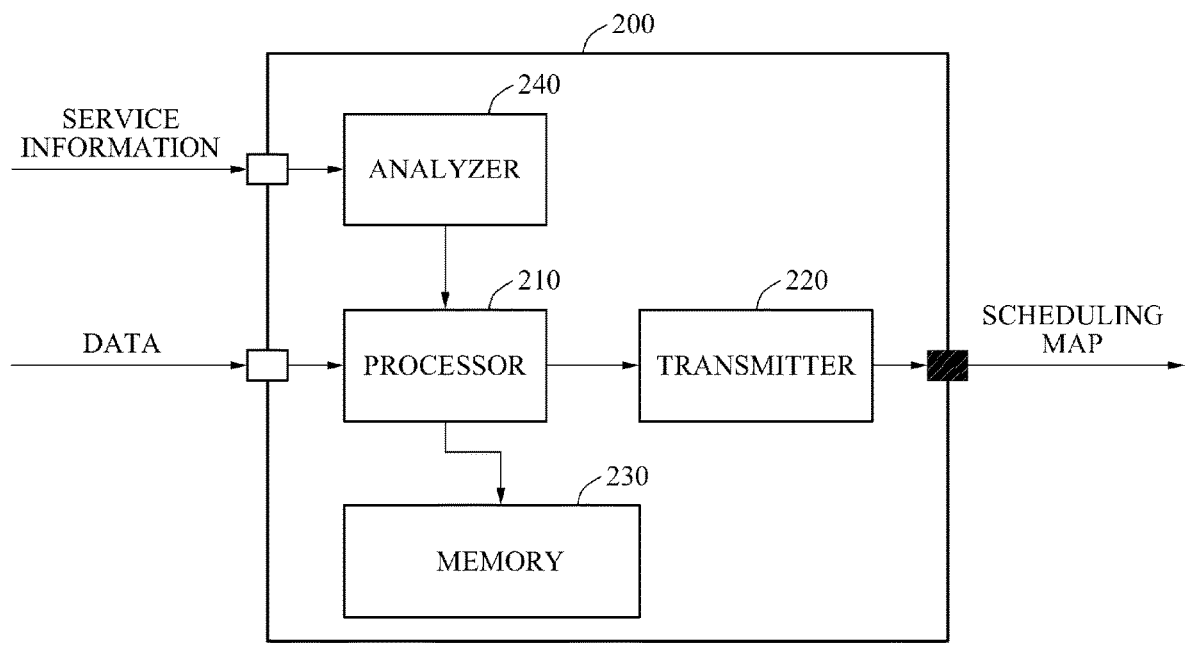
FIG. 2 illustrates a scheduler according to example embodiments.

FIG. 2 illustrates a scheduler 200 according to example embodiments. According to various embodiments, the scheduler 200 may be included in the server 110.

Referring to FIG. 2, the scheduler 200 includes a processor 210, a transmitter 220, a memory 230, and an analyzer 240. The scheduler 200 generates a scheduling map based on data collected during an interval of generating a scheduling map set to be greater than or equal to a preset size of the scheduling map. The size of the scheduling map may be set for a service having a shortest transmission period based on a transmission period of each service.

Also, the scheduler 200 may generate the scheduling map based on the same type of sample data as a type of the collected data during the interval of generating the scheduling map set to be greater than or equal to the preset size of scheduling map.

The processor 210 is a hardware computing device designed to sequentially carry out a sequence of arithmetic and/or logical operations, and equipped to record/store digital data on a machine readable medium. The processor 210 may be configured to carry out instructions of a computer program by performing the basic arithmetical, logical, and input/output operations of the system. The one or more processors may include a single-core processor, a dual-core processor, a triple-core processor, a quad-core processor, etc. Additionally, the processor 210 may be a field programmable gate array (FPGA), a peripheral interface controller (PIC), a digital signal processor (DSP), and/or any other like processing device that may be customized or otherwise configurable for specialized tasks. The processor 210 may perform a variety of functions and may process data by executing program code, one or more software modules, firmware, middleware, microcode, hardware description languages, and/or any other like set of instructions stored in the memory 230. The program code may be provided to the processor 210 by memory 230, one or more drive mechanisms (not shown), and/or via a network interface. In order to perform the variety of functions and data processing operations, the program code and/or software components are loaded into the processor 210. Once the program code is loaded into the processor 210, the processor 210 may be programmed to perform the various operations and functions delineated by the program code, thereby transforming the processor 210 into a special purpose processor.

The processor 210 may schedule the collected data to form a packet by using a maximum number of items of data transmitted (or the maximum number of items of data to be transmitted) based on an MTU established between the client 150 and the server 110 and an allowable delay time of at least one service.

The processor 210 may verify or otherwise determine a first service corresponding to the collected data. As described in FIG. 1, each of the at least one service may have a different allowable delay time based on characteristics of the at least one service. Also, each of the at least one service may have a different transmission period based on characteristics of the at least one service. Thus, in various embodiments, each service may have a different period of time for transmitting data corresponding to the service.

The analyzer 240 may be a hardware computing device, a software module, and/or a combination of one or more hardware devices and one or more software modules configured to receive service information including the allowable delay time and the transmission period of the at least one service. The analyzer 240 may determine the service corresponding to the collected data based on the transmission period of the at least one service. The analyzer 240 may verify a service having a transmission period matching a transmission time of data periodically collected based on a desired (or alternatively "predetermined") point in time.

When a service having the transmission period matching the transmission time is verified or otherwise determined, the analyzer 240 may determine that the collected data corresponds to the service.

When at least two services having transmission periods matching the transmission time are verified, the analyzer 240 may verify or otherwise determine allowable delay times of the at least two services. The analyzer 240 may assign, allocate, or otherwise give a higher priority to a service having a shorter allowable delay time among the at least two services. Through this, the analyzer 240 may determine that the collected data corresponds to a service having the shortest allowable delay time among the at least two services.

The analyzer 240 may transmit information associated with the service that corresponds to the collected data to the processor 210. The processor 210 may verify or otherwise determine a first service corresponding to the collected data based on the transmitted information.

The processor 210 may compare the allowable delay time with a threshold and determine whether the collected data is to be transmitted or stored in the memory 230. It should be noted that the memory 230 may have a same or similar structure and/or configuration as memory 140 and/or memory 180. The threshold may be a value set in advance of generating the scheduling map, and defined between the server 110 and the client 150.

When the allowable delay time of the first service is greater than the threshold, the processor 210 may store the collected data in the memory 230. When a number of data items stored in the memory 230 is greater than or equal to the maximum number of transmitted data items (or the maximum number of items of data to be transmitted), the stored data may be scheduled to form the packet.

When the number of items of data stored in the memory 230 is less than or equal to the maximum number of transmitted data items (or the maximum number of items of data to be transmitted), the processor 210 may verify or otherwise determine allowable delay times of the stored data. When at least one of the allowable delay times expires, the processor 210 may schedule the stored data to form the packet although the number of stored data items is less than the maximum number of items of the transmitted data (or the maximum number of items of data to be transmitted).

When the allowable delay time of the first service is less than or equal to the threshold, the processor 210 may generate a packet including the collected data and previously stored (or alternatively "pre-stored") data. When the allowable delay time of the first service is less than or equal to the threshold, the collected data may be transmitted immediately without delay. Thus, the collected data and the previously stored (or alternatively "pre-stored") data may be scheduled to form the packet. When the memory 230 does not include the previously stored (or alternatively "pre-stored") data, the processor 210 may schedule the collected data to form the packet.

The term "schedule", "scheduling", and the like may indicate scheduling of the collected data to form the packet at a point in time at which conditions for generating the packet are satisfied starting from a time at which a scheduling map begins or is otherwise executed.

The processor 210 may generate the scheduling map to schedule the generated packet to be transmitted to the client 150. Based on the generated schedule map, the transmitter 220 may transmit a packet generated by incorporating collected data to a transmitting and receiving module.

When the server 110 transmits and receives data based on the scheduling map, the server 110 may match the time at which the scheduling map starts to a desired (or alternatively "predetermined") point in time or a time at which data transmission is initiated. Subsequently, the server 110 may generate the packet at a point in time at which the collected data is scheduled to form the packet, and transmit the generated packet to the client 150.

The memory 230 may store the collected data in a priority order according to a transmission threshold time. Through this, the processor 210 may verify or otherwise determine a transmission threshold time for each item of the collected data.

When a transmission threshold time for each item of stored data is equal, the memory 230 may store the data in an order that each item of the data is collected. Through this, the processor 210 may schedule the data to form the packet based on the order at which the data is collected.

In FIG. 2, the server 110 may generate a separate scheduling map using the scheduler 200. Based on the generated scheduling map, the server 110 may generate the packet including the collected data and transmit the generated packet to the client 150. The client 150 may also perform data transmission and reception by generating a scheduling map with reference to FIG. 2. Hereinafter, descriptions regarding a scheduling map generation method will be provided with reference to FIG. 3.

FIG. 3 illustrates a scheduling map according to example embodiments.

A graph of FIG. 3 indicates a scheduling map generated by scheduling collected data to form a packet according to example embodiments. Hereinafter, a scheduling map generation method may be described based on some example embodiments. The scheduling map generation method of FIG. 3 may be the same or similar as the method of generating the packet in the packet generator 120 of FIG. 1.

In FIG. 3, the server 110 may communicate with the client 150 through a Bluetooth device. When the server 110 communicates with the client 150, an MTU may be 1008 bytes. Also, a quantity of data collected by the server 110 or the client 150 may be equally 200 bytes. Thus, a maximum number of items of data included in a packet to be transmitted between the server 110 and the client 150 may be "5"

Three types of services may be provided as described below. A service number 0 may be a monitoring service for providing the collected data to a user in real time. A service number 1 may be an analysis service for analyzing biometric information on user based on the collected data. A service number 2 may be a log service for storing the collected data. Transmission periods and allowable delay times of the services may be shown in Table 1.

TABLE 1

| NO. | Type | Transmission frequency (Hz) | Allowable delay time (μs) | Allowable delay frequency (Hz) |
|---|---|---|---|---|
| 0 | Monitoring service | 2 | 0 | 0 |
| 1 | Analysis service | 5 | 100 | 4 |
| 2 | Log service | 20 | 3000 | 60 |

A scheduling map size may indicate a total number of items of data to be transmitted per second. The scheduling map size may be determined based on a service having a highest transmission frequency. For example, in Table 1, the log service has the highest transmission frequency of 20 hertz (Hz). Thus, the scheduling map size may be set as 20 Hz and 20 items of data may be transmitted per second. Since the scheduling map size indicates the total number of data items to be transmitted per second, a transmission period for each service may be used through a conversion into the transmission frequency.

Referring to FIG. 3, an X-axis represents a time based on a unit of a frequency, and a Y-axis represents a service number and collected data. A scheduling map generation interval may be set as a twice of 20 Hz set as the scheduling map size. Thus, a value of 0.05 seconds may be obtained by dividing one second of the X-axis by "20".

The service number of the Y-axis may be determined based on a point in time at which data is collected. For example, since the transmission frequency of the log service for storing the collected data is 20 Hz data may be collected by a sensor based on a unit of 20 Hz.

A service corresponding to the collected data may be determined based on a desired (or alternatively "predetermined") point in time, for example, a point in time t+0. The point in time t+0 may be a first point in time at which 20 subsequent data items are collected after 20 initial data items are collected. Transmission frequencies of the monitoring service, the analysis service, and/or the log service may overlap one another at the point in time t+0. Similarly, data d+10 collected at a point in time t+10 may be determined as the monitoring service corresponding to the service number of "0".

When the transmission frequencies of at least two services overlap, allowable delay times of the services may be compared to one another. Since a shorter allowable delay time is determined to have a higher priority, the collected data may be determined to correspond to a service having the shortest allowable delay time. Thus, data d+0 collected at the point in time t+0 may be determined to correspond to the monitoring service having the allowable delay time of 0 μs, and may correspond to the service number 0.

Data d+1, d+2, and d+3 collected at points in time t+1, t+2, t+3, respectively may match the transmission frequency of the log service. The data d+1 through d+3 may be determined to correspond to the log service and thus, may correspond to the service number 2.

Similarly, data d+5 through d+7, d+9, d+11, d+13 through d+15 and d+17 through d+19 collected at points in time t+5 through t+7, t+9, t+11, t+13 through t+15, and t+17 through t+19, respectively may match the transmission frequency of the log service. The data d+5 through d+7, d+9, d+11, d+13 through d+15 and d+17 through d+19 may be determined to correspond to the log service and thus, may correspond to the service number 2.

The transmission frequencies of the analysis service and the log service may overlap at a point in time t+4. Since the allowable delay time of the analysis service is less than the allowable delay time of the log service, the analysis service may have a higher priority than a priority of the log service. Thus, the data d+4 collected at the point in time t+4 may be determined to correspond to the log service and the service number 1.

Similarly, the transmission frequencies of the analysis service and the log service may overlap at points in time t+8, t+12, and t+16. Since the priority of the analysis service is higher than the priority of the log service, data d+8, d+12, and d+16 may be determined to correspond to the analysis service and the service number 1.

Hereinafter, a non-limiting example embodiment of a method of generating a packet including collected data will be explained based on the aforementioned descriptions. Data d+0 collected at a point in time t+0 may correspond to the monitoring service. The processor 210 may verify or otherwise determine the allowable delay time of the data d+0 is 0 μs, and thus, may schedule data d−1, which is stored in advance, and the data d+0 to form a packet.

The allowable delay time may be set as three seconds for each of the data d+1 through d+3 corresponding to the log service. Thus, the processor 210 may sequentially store the data d+1 through d+3 in the memory 230. The memory 230 may store the data d+1 through d+3 by setting the transmission threshold time based on the allowable delay times of the data d+1 through d+3. In this example, the allowable delay time for each of the data d+1 through d+3 may be greater than the scheduling map size, and thus, the transmission threshold time may not be set separately.

The allowable delay time of data d+4 corresponding to the analysis service may be set as 5 μs, for example, 4 Hz. Thus, the processor 210 may store the data d+4 by setting the transmission threshold time based on the allowable delay time.

The processor 210 may store the data d+5 corresponding to the log service in the memory 230. As a result of the storing, five items of data may be present in the memory 230. In this example, the number of items of stored data is greater than or equal to the maximum number of items of the transmitted data (or the maximum number of items of data to be transmitted), and thus, the processor 210 may schedule the stored data to form a packet. Accordingly, the data d+1 through d+5 may be scheduled to form a single packet. Subsequently, a packet may be generated using the data d+1 through d+5, and the generated packet including the data d+1 through d+5 may be transmitted to the client 150, and thus, the number of items of data stored in the memory 230 may be "0" at the point in time t+5.

The processor 210 may sequentially store the data d+6, d+7, and d+9 corresponding to the log service in the memory 230. Also, subsequent to the data d+7, the processor 210 may store the data d+8 in the memory 230 by setting the transmission threshold time based on the allowable delay time.

Since data d+10 corresponds to the monitoring service, the processor 210 may schedule the data d+10 and data d+6 through d+9 to form a single packet. In response to the scheduling, a packet may be generated using the data d+6 through d+10, and the generated packet including the data d+6 through d+10 may be transmitted to the client 150, and thus, the number of items of data stored in the memory 230 may be "0" at the point in time t+5.

The processor 210 may sequentially store the data d+11, d+13, and d+14 corresponding to the log service in the memory 230. Since the data d+12 corresponds to the analysis service, the processor 210 may store the data d+12 subsequent to the data d+11 by setting the transmission threshold time.

The transmission threshold time of the data d+12 may be the point in time t+14. Since the data d+12 corresponds to the analysis service, the allowable delay time may be 100 μs, for example, 4 Hz. Thus, the point in time t+14 may be obtained as the transmission threshold time by adding the allowable delay time to the point in time t+12 at which the data d+12 is collected.

Thus, although four items of data are present in the memory 230 at the point in time t+14 and a number of items of the data is less than the maximum number of items of the transmitted data (or the maximum number of items of data to be transmitted), the processor 210 may schedule the data d+11 through d+14 to form a packet. In response to the scheduling, the generated packet including the data d+11 through d+14 may be transmitted to the client 150, and thus, the number of data items stored in the memory 230 may be "0" at the point in time t+14.

The processor 210 may sequentially store the data d+15, d+17, and d+18 corresponding to the log service in the memory 230. Since the data d+16 corresponds to the analysis service, the processor 210 may store the data d+16 subsequent to the data d+15 by setting the transmission threshold time based on the allowable delay time.

The transmission threshold time of the data d+16 may be the point in time t+18. Since the data d+16 corresponds to the analysis service, the allowable delay time may be 100 μs, for example, 4 Hz. Thus, the point in time t+18 may be obtained as the transmission threshold time by adding the allowable delay time to the point in time t+16 at which the data d+16 is collected.

Thus, although four items of data are present in the memory 230 at the point in time t+18 and the number of items of the data is less than the maximum number of items of the transmitted data (or the maximum number of items of data to be transmitted), the processor 210 may schedule the data d+15 through d+18 to form a packet.

Since the data d+19 corresponds to the log service, the processor 210 may store the data d+19 in the memory 230. Data collected subsequent to the data d+19 may be included in a subsequent period based on the scheduling map size. Thus, when the data d+0 through d+10 is used for the scheduling based on the scheduling map size, the data d+19 may be scheduled to form a packet although the number of items of data present in the memory 230 is "1" at the point in time t+19 and the allowable delay time has not arrived. In this example, the number of data transmission times may be "6".

As described above, when the data d−1 and d+0 is set form a packet at the point in time t+0, the data d−1 through d+18 may be scheduled to form a packet. In this example, the number of data transmission times may be "5".

A number of packet transmission times may be minimized by shifting a boundary based on the scheduling map size. In FIG. 3 the boundary is indicated by a rectangular shaped dotted line. As such, the number of packet transmission times may be adjusted to be minimized.

Accordingly, as shown in the graph of FIG. 3, the collected data and previously stored (or alternatively "pre-stored") data may be scheduled to form a packet at each of the points in time t+0, t+5, t+10, t+14, and t+18.

When the collected data is transmitted using conventional a period-based scheme, the number of data transmission times may be "20". By contrast, when a packet including the collected data is transmitted using the above described scheduling method, the number of data transmission times may be "5". Thus, by generating the packet including the collected data, the number of data transmission times may be reduced by 75%.

A reduction in the number of data transmission times may result in a decrease in power consumption associated with the data transmission performed between the server 110 and the client 150 and may also result in an increase in a use of time for other functions of the server 110 and the client 150.

FIG. 4 illustrates a quantity of data and an MTU according to example embodiments.

FIG. 4 shows a relationship between a quantity of collected data and an MTU established in a Bluetooth communication between the server 110 and the client 150. As described above, the MTU may be 1028 bytes in the Bluetooth communication between the server 110 and the client 150.

When the quantity of the collected data is 200 bytes, a maximum number of items of transmitted data (or the maximum number of items of data to be transmitted) may be "5" corresponding to an integer value obtained by dividing the MTU by the quantity of the collected data. Accordingly, a packet including up to five items of data may be generated to be transmitted and received between the server 110 and the client 150.

FIG. 5 illustrates a packet generated to be transmitted to a client according to example embodiments.

Referring to FIG. 5, packets 510 through 550 may correspond to the scheduled packets of FIG. 3. Referring to FIGS. 3 and 5, the packet 510 may be scheduled to be generated at a point in time t+0; the packet 520 may be scheduled to be generated at a point in time t+5; the packet 530 may be scheduled to be generated at a point in time t+10; the packet 540 may be scheduled to be generated at a point in time t+14; and the packet 550 may be scheduled to be generated at a point in time t+18.

Referring to FIG. 5, the packet 510 includes data d+0 511 collected at the point in time t+0. The data d+0 511 may correspond to a monitoring service, and an allowable delay time of the monitoring service may be 0 μs. Thus, the data d+0 511 may be scheduled to form the packet 510 although the packet 510 includes two items of data.

The packet 520 may include five items of data equal to a maximum number of transmitted data items (or the maximum number of items of data to be transmitted), and thus, the five items of data may be scheduled to form the packet 520. Data d+4 521 may correspond to an analysis service, and an allowable delay time of the data d+4 521 may be 100 μs. Since a number of data items included in the packet 520 is "5" at a point in time t+5, the five items of data including data d+5 522 may be scheduled to form the packet 520 at the point in time d+5 although a transmission threshold time of the data d+4 521 is yet to expire.

The packet 530 may include five items of data equal to the maximum number of items of transmitted data (or the maximum number of items of data to be transmitted), and thus, the five items of data may be scheduled form the packet 530. Data d+8 531 may correspond to the analysis service, and data d+10 532 may correspond to the monitoring service. Since a transmission threshold time of the data d+8 531 is a point in time t+10 and an allowable delay time of the data d+10 532 is 0 µs, transmission may be performed at the point in time t+10. Concisely, since the packet 530 includes the same number of items of data as the maximum number of items of transmitted data (or the maximum number of items of data to be transmitted), the transmission threshold time of the data d+8 531 arrives, and the data d+12 532 is to be transmitted immediately without delay, the five data items may be scheduled to form the packet 530.

The packet 540 may include four data items less than the maximum number of transmitted data items (or the maximum number of items of data to be transmitted). Since data d+12 541 corresponds to the analysis service, a transmission threshold time of the data d+12 541 may be determined as a point in time t+14 based on the allowable delay time of the analysis service. Thus, the four data items may be scheduled to form the packet 540 at the point in time t+14 at which data d+14 542 is collected.

The packet 550 may include four data items less than the maximum number of transmitted data items (or the maximum number of items of data to be transmitted). Since data d+16 551 corresponds to the analysis service, a transmission threshold time of the data d+16 551 may be determined as a point in time t+18 based on the allowable delay time of the analysis service. Thus, the four data items may be scheduled to form the packet 550 at the point in time t+18 at which data 552 is collected.

The descriptions about a method of setting information on a corresponding service and generating a scheduling map based on the information are provided with reference to FIGS. 3 through 5; however, the example embodiments are not limited thereto. Thus, it would be apparent to those skilled in the art that an apparatus for transmitting and receiving data periodically may reduce the number of transmission times by generating a packet including data transmitted based on the aforementioned example embodiments despite using different periods related to collected data and information on the corresponding service.

Figure 6:
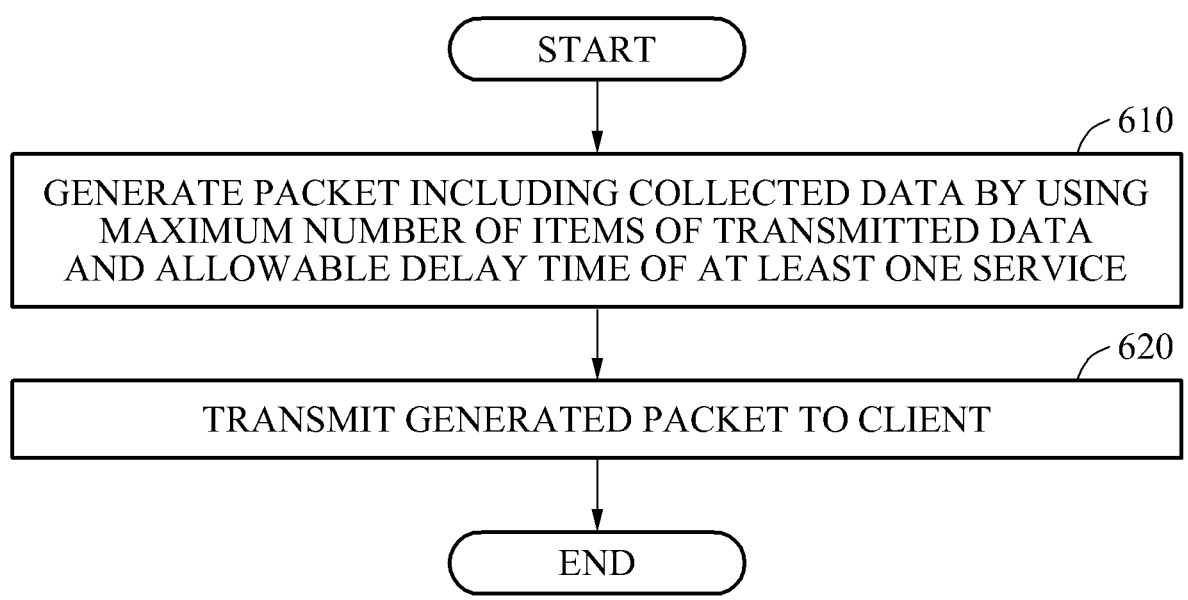
FIG. 6 illustrates a server operation method according to example embodiments.

FIG. 6 illustrates a server operation method according to example embodiments. For illustrative purposes, the server operation method will be described as being performed by one or more components of the server 110. However, it should be noted that any device that has the same or similar design and/or configuration as server 110 may perform the server operation method according to example embodiments.

In operation 610, the packet generator 120 generates a packet including collected data using a maximum number of items of data transmitted (or the maximum number of items of data to be transmitted) based on an MTU established between the server 110 and the client 150, and an allowable delay time of at least one service.

The allowable delay time may be set for each service in advance, and set differently for each service. In a process of transmitting, the server 110 may transmit data to the client 150 within the allowable delay time set for a service corresponding to the data.

The MTU may be a value of a maximum quantity of data transmitted without using a segment, and established between the server 110 and the client 150. When a quantity of data is greater than or equal to the MTU, the data may be divided into a number of packets to be transmitted. Thus, the MTU may be a quantity of data transmitted using a single packet.

To reduce power consumption by reducing the number of data communication times, the packet generator 120 may generate a packet by storing the collected data in lieu of transmitting the collected data periodically.

In operation 620, the transmitter and receiver 130 transmits the packet generated in the packet generator 120 to the client 150. As described above, in lieu of transmitting the collected data periodically, the collected data may be stored to form the packet and the generated packet may be transmitted to the client 150. Through this, the number of data transmission times may be reduced.

Figure 7:
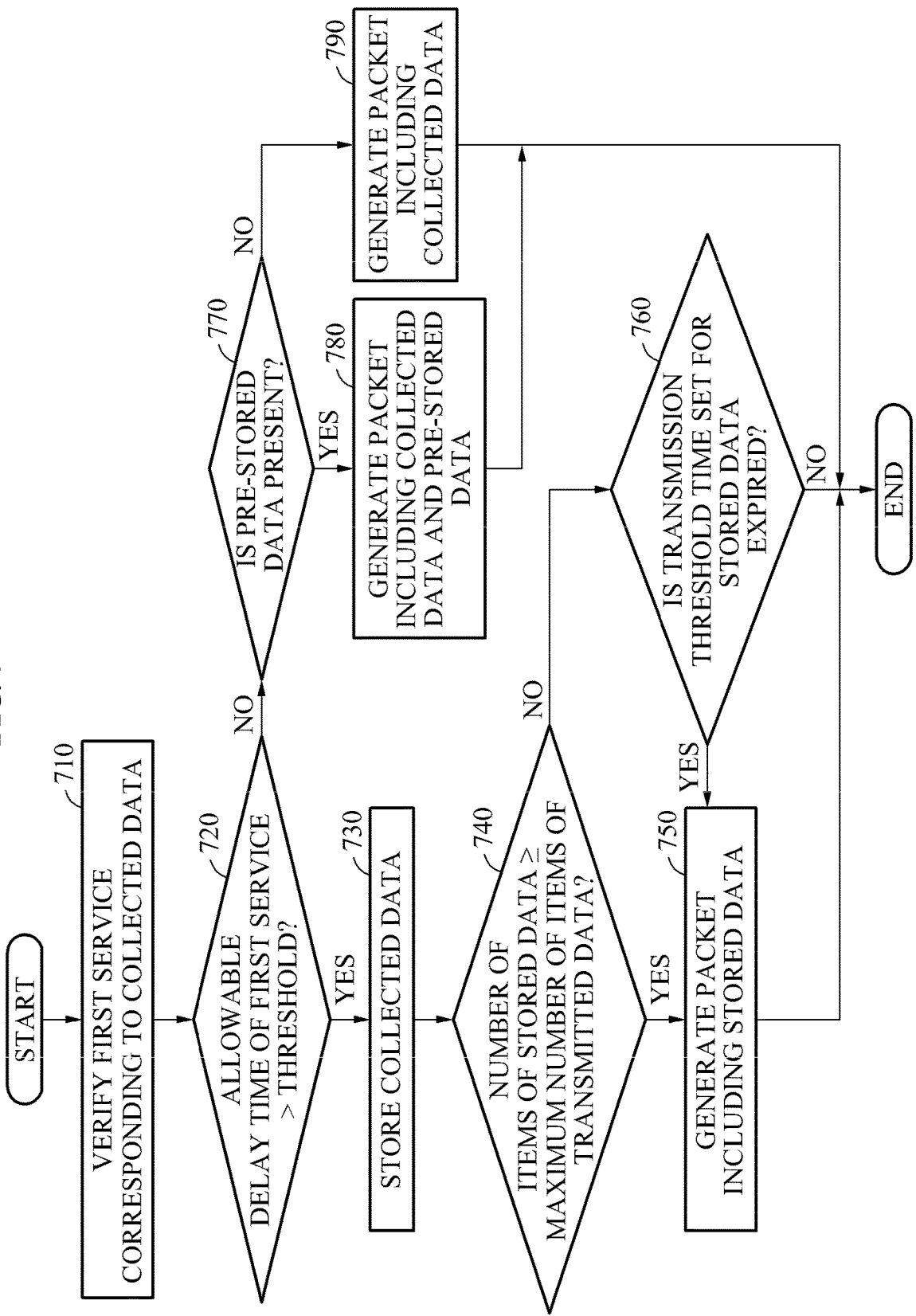
FIG. 7 illustrates a method of generating a packet to be transmitted to a client according to example embodiments.

FIG. 7 illustrates a method of generating a packet to be transmitted to a client according to example embodiments. For illustrative purposes, the method of generating a packet to be transmitted to a client will be described as being performed by one or more components of the server 110. However, it should be noted that any device that has the same or similar design and/or configuration as server 110 may perform the method of generating a packet to be transmitted to a client according to example embodiments.

In operation 710, the packet generator 120 verifies or otherwise determines a first service corresponding to collected data. The packet generator 120 may verify or otherwise determine the first service corresponding to the collected data based on information associated with the service corresponding to the collected data.

In operation 720, the packet generator 120 compares an allowable delay time of the first service to a threshold. According to various embodiments, the threshold may be set in advance, determined based on one or more design choices, and/or determined based on empirical studies. When the allowable delay time is less than or equal to the threshold, the collected data may be transmitted immediately without delay. When the allowable delay time is greater than the threshold, the collected data may not be transmitted until a transmission threshold time expires.

If at operation 720 the allowable delay time of the first service is determined to be greater than the threshold, the packet generator 120 proceeds to operation 730 to store the collected data in the memory 140. As described above, when the allowable delay time of the first service is greater than the threshold, the collected data may be stored in the memory 140 until the expiration and/or termination of the transmission threshold time determined based on the allowable delay time of the first service.

In operation 740, the packet generator 120 determines whether the number of items of stored data is greater than or equal to a maximum number of transmitted data items (or the maximum number of items of data to be transmitted). In various embodiments, the packet generator 120 compares a number of data items stored in the memory 140 to the maximum number of transmitted data items (or the maximum number of items of data to be transmitted). The maximum number of transmitted data items (or the maximum number of items of data to be transmitted) may be determined based on an MTU established between the server 110 and the client 150. Power consumption may increase in order to transmit data greater than the maximum number of transmitted data items (or the maximum number of items of data to be transmitted).

If at operation 740 the number of stored data items is greater than or equal to the maximum number of transmitted data items (or the maximum number of items of data to be transmitted), the packet generator 120 proceeds to operation 750 to generate a packet including the stored data and transmit the generated packet to the client 150.

If at operation 740 the number stored data items is determined to be less than the maximum number of transmitted data items (or the maximum number of items of data to be transmitted), the packet generator 120 proceeds to operation 760 to verify or otherwise determine whether a transmission threshold time set for each stored data items expires. As described above, the transmission threshold time may be set based on the allowable delay time of each service, and thus, the collected data may need to be transmitted within the transmission threshold time.

If at operation 760, the packet generator determines that at least one of the allowable delay times set for the stored data expires, the packet generator 120 proceeds to operation 750 to generate a packet including the stored data and transmit the generated packet to the client 150. In various embodiments, the packet generator 120 may schedule the stored data to form the packet even though the number of stored data items is less than the maximum number of transmitted data items (or the maximum number of items of data to be transmitted).

Referring back to operation 720, if the allowable delay time of the first service is determined to be less than or equal to the threshold, the packet generator 120 proceeds to operation 770 to verify of otherwise determine whether data previously stored (or alternatively "pre-stored") in the memory 140 is present. As described above, when the allowable delay time of the first service is less than or equal to the threshold, the collected data may need to be transmitted immediately without delay. Thus, the packet generator 120 may determine data scheduled to form the packet by verifying or otherwise determining whether the data previously stored (or alternatively "pre-stored") in the memory 140 is present.

If at operation 770 the data previously stored (or alternatively "pre-stored") in the memory 140 is determined to be present, the packet generator 120 proceeds to operation 780 to generate a packet including the collected data and the previously stored (or alternatively "pre-stored") data. Otherwise, in operation 790, when the data previously stored (or alternatively "pre-stored") in the memory 140 is absent, the packet generator 120 generates a packet including the collected data.

Figure 8:
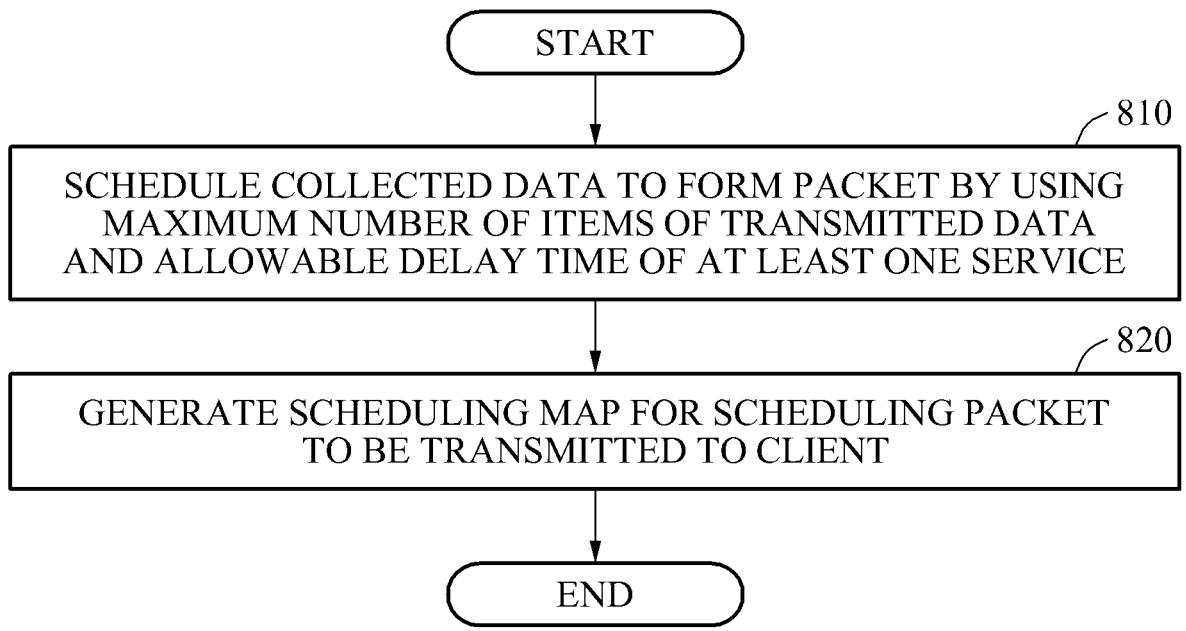
FIG. 8 illustrates a scheduling map generation method according to example embodiments.

FIG. 8 illustrates a scheduling map generation method according to example embodiments. For illustrative purposes, the scheduling map generation method will be described as being performed by one or more components of the server 110. However, it should be noted that any device that has the same or similar design and/or configuration as server 110 may perform the scheduling map generation method according to example embodiments.

The scheduler 200 may generate the scheduling map based on the same or a similar type of sample data as a type of data collected during an interval of generating a scheduling map set to be greater than or equal to a preset or desired scheduling map size.

In operation 810, the processor 210 schedules the collected data to form a packet by using a maximum number of items of data transmitted (or the maximum number of items of data to be transmitted) based on an MTU established between the client 150 and the server 110 and an allowable delay time of at least one service.

The scheduling may indicate scheduling the collected data to form the packet at a point in time at which conditions for generating the packet are satisfied, starting from a time at which the scheduling map begins.

In operation 820, the processor 210 generates the scheduling map for scheduling the packet to be transmitted to the client 150. Based on the generated schedule map, the transmitter 220 may transmit the packet including the collected data to a transmitting and receiving module.

Figure 9:
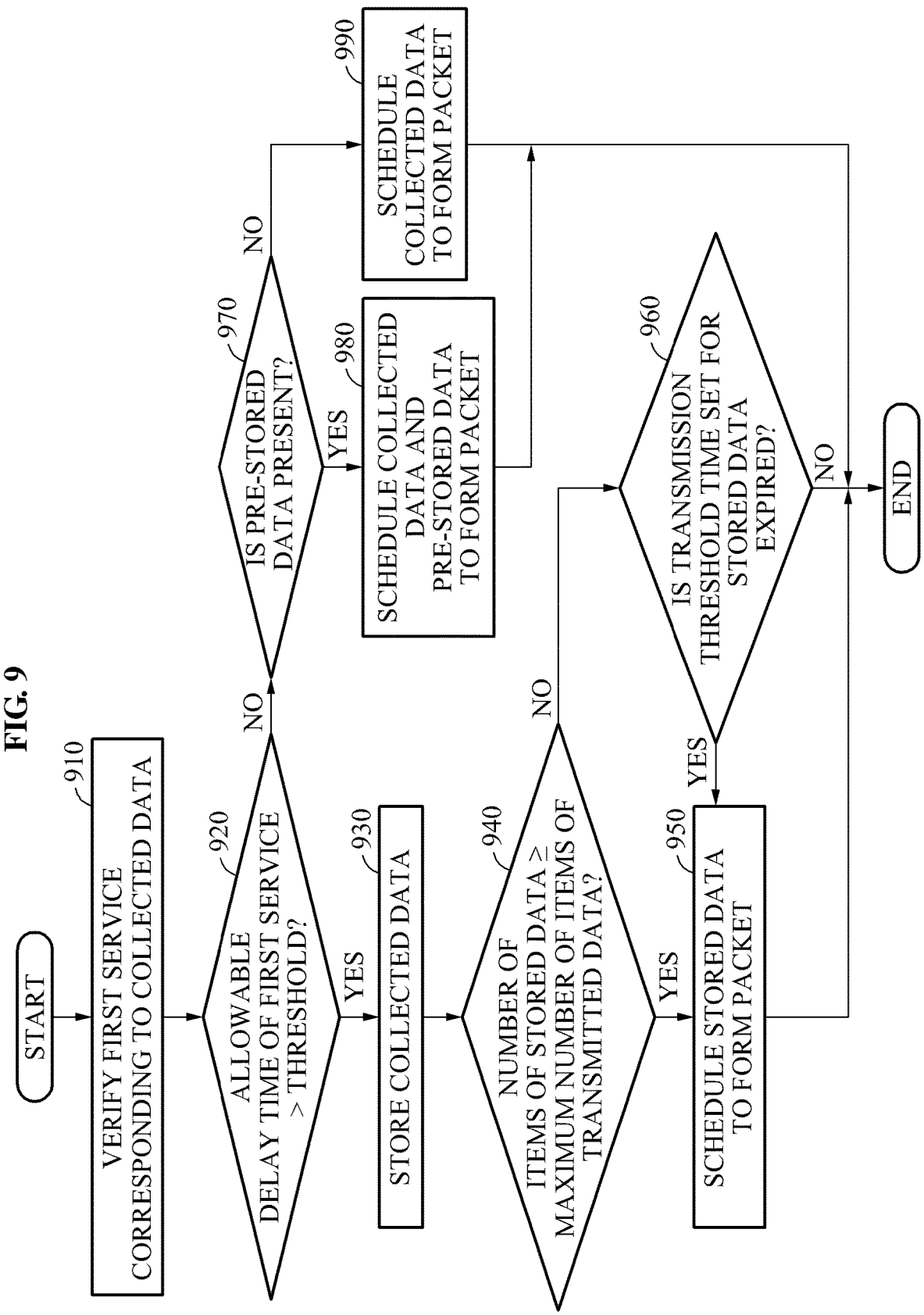
FIG. 9 illustrates a scheduling method of generating a packet to be transmitted to a client according to example embodiments.

FIG. 9 illustrates a scheduling method of generating a packet to be transmitted to a client according to example embodiments. For illustrative purposes, the scheduling method of generating a packet to be transmitted to a client will be described as being performed by one or more components of the server 110. However, it should be noted that any device that has the same or similar design and/or configuration as server 110 may perform the scheduling method of generating a packet to be transmitted to a client according to example embodiments.

In operation 910, the processor 210 verifies or otherwise determines a first service corresponding to collected data. The processor 210 may verify or otherwise determine the first service corresponding to the collected data based on information on a service corresponding to the collected data received using the analyzer 240.

In operation 920, the processor 210 determines whether the allowable delay time of a first service is greater than a threshold. In various embodiments, the processor 210 compares an allowable delay time of the first service to the threshold. The threshold may be set in advance, determined based on one or more design choices, and/or determined based on empirical studies. When the allowable delay time is less than or equal to the threshold, the collected data may be transmitted immediately without delay. When the allowable delay time is greater than the threshold, the collected data may not be transmitted until a transmission threshold time expires.

If at operation 920 the allowable delay time of the first service is determined to be greater than the threshold, the processor 210 proceeds to operation 930 to store the collected data in the memory 230. Also, when the allowable delay time of the first service is greater than the threshold, the transmitting of the collected data may not be performed immediately. Thus, the collected data may be stored in the memory 230 until an expiration and/or termination of the transmission threshold time determined based on the allowable delay time of the first service.

In operation 940, the processor 210 determines whether a number of stored data items in the memory 230 is greater than or equal to a maximum number of transmitted data items (or the maximum number of items of data to be transmitted). In various embodiments, the processor 210 compares the number of stored data items in the memory 230 to the maximum number of transmitted data items (or the maximum number of items of data to be transmitted). When data greater than the maximum number of transmitted data items (or the maximum number of items of data to be transmitted) is transmitted, the data may not be transmitted using a single packet and additional transmission of an excess portion of the data may be performed, thereby increasing power consumption in data transmission.

If at operation 940 the number of items of stored data is determined to be greater than or equal to the maximum number of items of transmitted data (or the maximum number of items of data to be transmitted), the processor 210 proceeds to operation 950 to schedule the stored data to form a packet to be transmitted to the client 150.

If at operation 940 the number of items of stored data is determined to be less than the maximum number of items of transmitted data (or the maximum number of items of data to be transmitted), the processor 210 proceeds to operation 960 to verify or otherwise determine whether a transmission threshold time set for each item of the stored data has expired. If at operation 960 the processor 210 determines that the transmission threshold time has not expired, the stored data may to be transmitted immediately without delay.

If at operation 960 the processor 210 determines that at least one of allowable delay times set for the stored data has expired, the processor 210 proceeds to operation 950 to schedule the stored data to form the packet although the number of stored data items is less than the maximum number of transmitted data items (or the maximum number of items of data to be transmitted).

Referring back to operation 920, if the allowable delay time of the first service is determined to be less than or equal to the threshold, the processor 210 proceeds to operation 970 to verify or otherwise determine whether data previously stored (or alternatively "pre-stored") in the memory 230 is present. By verifying or otherwise determining whether the data previously stored (or alternatively "pre-stored") is present, the processor 210 may determine data scheduled to form the packet.

If at operation 970, the processor 210 determines that the data previously stored (or alternatively "pre-stored") in the memory 230 is present, the processor 210 proceeds to operation 980 to schedule the collected data and the previously stored (or alternatively "pre-stored") data to form a packet. If at operation 970, the processor 210 determines that the data previously stored (or alternatively "pre-stored") in the memory 230 is absent (or otherwise not present), the processor 210 proceeds to operation 990 to schedule the collected data to form a packet.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of operating a server communicating with a client, the method comprising:
generating, by the server configured to provide a plurality of services, a packet including at least one collected data item of at least one service of the plurality of services, the generating of the packet using a maximum number of data items to be transmitted based on a maximum transmission unit (MTU) established between the client and the server and at least one allowable delay time defined for the at least one service, the maximum number of data items corresponding to a value obtained by dividing the MTU by a quantity of data item corresponding to the at least one service; and
transmitting, by the server, the generated packet to the client,
wherein the generating includes,
determining a target service from among the plurality of services corresponding to a collected target data item,
setting a target transmission threshold time for the collected target data item based on a target allowable delay time of the target service, the target allowable delay time set differently depending on whether the target service is a first service or a second service,
storing the collected target data item in response to the collected target data item being determined not to be transmitted immediately based on the target transmission threshold time,
generating the packet in response to a number of stored data items being greater than or equal to the maximum number of data items, and
generating the packet including the stored data items in response to at least one of transmission threshold times of the stored data items expiring regardless of whether the number of the stored data items reach the maximum number of data items or not.

2. The method of claim 1, wherein a first allowable delay time of the first service is set differently than a second allowable delay time of the second service.

3. The method of claim 1, wherein the determining a target service comprises:
   determining the target service from among the plurality of services that corresponds to the collected target data item based on (i) a transmission period of the at least one service, and (ii) an allowable delay time of the at least one service in response to an overlap of a point in time at which the data item is stored.

4. The method of claim 1, wherein the generating further comprises:
   generating the packet to include the target data item and a pre-stored data item in response to the target data item being determined to be transmitted immediately based on the target transmission threshold time.

5. The method of claim 4, wherein the generating the packet to include the target data item and a pre-stored data item comprises:
   generating the packet including only the collected target data item in response to the pre-stored data item being absent.

6. The method of claim 1, wherein the storing comprises:
   storing the collected target data item according to transmission threshold times of pre-stored data items.

7. A method of generating a scheduling map for data transmission, the method comprising:
   scheduling, by a server configured to provide a plurality of services, at least one collected data item of at least one service of the plurality of services to form a packet by using a maximum number of data items to be transmitted based on a maximum transmission unit (MTU) established between a client and the server and at least one allowable delay time of the at least one service, the maximum number of data items corresponding to a value obtained by dividing the MTU by a quantity of data item corresponding to the at least one service; and
   generating, by the server, the scheduling map for scheduling the packet to be transmitted to the client,
   wherein the scheduling includes,
   determining a target service from among the plurality of services corresponding to a target data item, setting a target transmission threshold time for the target data item based on a target allowable delay time of the target service, the target allowable delay time set differently depending on whether the target service is a first service or a second service,
   storing the target data item in response to the target data item being determined not to be transmitted immediately based on the target transmission threshold time,
   scheduling the target data item to form the packet in response to a number of stored data items being greater than or equal to the maximum number of data items, and
   scheduling the target data item to form the packet including the stored data items in response to at least one of transmission threshold times of the stored data items expiring regardless of whether the number of the stored data items reach the maximum number of data items or not.

8. The method of claim 7, wherein the scheduling further comprises:
   scheduling the target data item and a pre-stored data item to form the packet in response to the target data item being determined to be transmitted immediately based on the target transmission threshold time.

9. A server configured to communicate with a client and provide a plurality of services, the server comprising:
   a packet generator including at least one hardware component and configured to generate a packet including at least one collected data item of at least one service of the plurality of services, using a maximum number of data items to be transmitted based on a maximum transmission unit (MTU) established between the client and the server and at least one allowable delay time of the at least one service, the maximum number of data items corresponding to a value obtained by dividing the MTU by a quantity of the at least one collected data item corresponding to the at least one service;
   a transmitter configured to transmit the generated packet to the client; and
   a memory device configured to store the at least one collected data item,
   wherein the packet generator is configured to,
   determine a target service from among the plurality of services corresponding to a collected target data item,
   set a target transmission threshold time for the collected target data item based on a target allowable delay time of the target service, the target allowable delay time set differently depending on whether the target service is a first service or a second service,
   store the collected target data item in response to the collected target data item being determined not to be transmitted immediately based on the target transmission threshold time,
   generate the packet in response to a number of stored data items of the at least one collected data item associated with the one of the first and second services in the memory device being greater than or equal to the maximum number of data items to be transmitted, and
   generating the packet including the stored data items in response to at least one of transmission threshold times of the stored data items expiring regardless of whether the number of the stored data items reach the maximum number of data items or not.

10. The server of claim 9, wherein the packet generator is configured to:
    generate the packet to include the target data item and a pre-stored data item in response to the target data item being determined to be transmitted immediately based on the target transmission threshold time.

* * * * *